US009116937B2

(12) United States Patent
Andres Gutierrez et al.

(10) Patent No.: US 9,116,937 B2
(45) Date of Patent: Aug. 25, 2015

(54) UNATTENDED BACKUP SYSTEM

(75) Inventors: Jose Juan Andres Gutierrez, Madrid (ES); Jose Juan Gonzalez Menaya, Madrid (ES); Francisco Milagro Lardies, Madrid (ES)

(73) Assignee: TELEFONICA, S.A., Madrid (ES)

( * ) Notice: Subject to any disclaimer, the term of this patent is extended or adjusted under 35 U.S.C. 154(b) by 171 days.

(21) Appl. No.: 13/702,942

(22) PCT Filed: Jun. 7, 2011

(86) PCT No.: PCT/EP2011/059332
§ 371 (c)(1),
(2), (4) Date: Feb. 21, 2013

(87) PCT Pub. No.: WO2011/154375
PCT Pub. Date: Dec. 15, 2011

(65) Prior Publication Data
US 2013/0144841 A1    Jun. 6, 2013

(30) Foreign Application Priority Data
Jun. 11, 2010    (ES) .................................. 201030908

(51) Int. Cl.
*G06F 7/00*      (2006.01)
*G06F 17/30*     (2006.01)
*G06F 11/14*     (2006.01)

(52) U.S. Cl.
CPC ...... *G06F 17/30309* (2013.01); *G06F 11/1458* (2013.01); *G06F 11/1464* (2013.01)

(58) Field of Classification Search
CPC ............ G06F 11/1458; G06F 11/1469; G06F 11/1451; G06F 11/1464; G06F 11/1456
USPC .......................................... 707/644
See application file for complete search history.

(56) References Cited

U.S. PATENT DOCUMENTS

| 6,775,273 | B1* | 8/2004 | Kung et al. ................... 370/356 |
| 2010/0017589 | A1 | 1/2010 | Reed et al. |
| 2011/0216646 | A1* | 9/2011 | Flinta et al. .................. 370/220 |

FOREIGN PATENT DOCUMENTS

WO    WO-2009072706 A1    6/2009

OTHER PUBLICATIONS

International Search Report issued in PCT/EP2011/059332 on Dec. 2, 2011.

* cited by examiner

*Primary Examiner* — Truong Vo
(74) *Attorney, Agent, or Firm* — Blank Rome LLP

(57)    ABSTRACT

The invention provides a process for performing automatic backups of a user's data contained in the local drives of at least one computer of a local area network by means of a Residential Gateway, which is in turn connected to a provider's Backup Server. A backup method is thus provided, which enables creating a backup in an automatic way without the need of providing UPnP support.

5 Claims, 1 Drawing Sheet

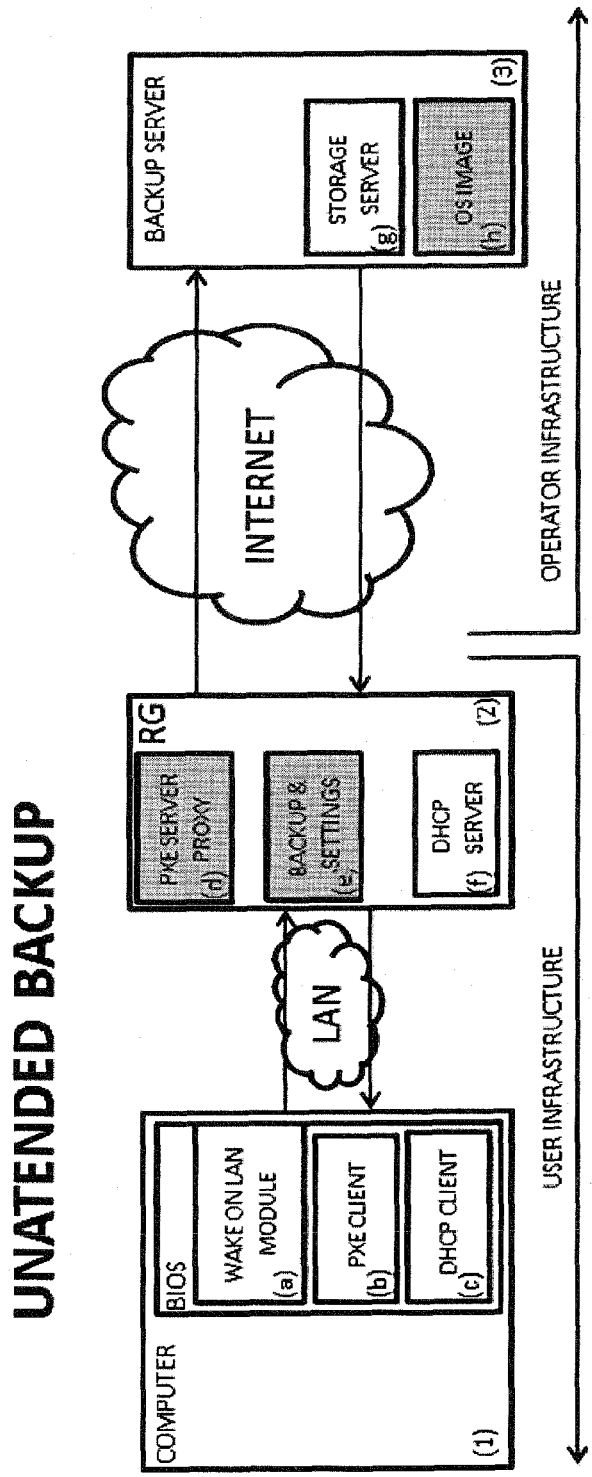

UNATTENDED BACKUP SYSTEM

This application is a U.S. national stage of International Patent Application No. PCT/EP2011/059332, filed Jun. 7, 2011, which claims priority to Spanish Patent Application No. P201030908, filed Jun. 11, 2010, the entire contents of which are hereby incorporated by reference.

FIELD OF THE INVENTION

The invention relates to the field of computer networks, in particular, it is referred to a new method for performing backups.

STATE OF THE ART

Hardware users need to safely store their personal contents in order to avoid data losses due to for example, hardware failures. Usually, backup procedures are tedious, require the user to have some sort of knowledge about the procedures that conform the backup and require the user's attention in order to perform the backup operations.

US2007/0098019 describes a method for selectively creating a backup of electronic content information on a home network by determining the importance of the content information and storing the backup under control of the relative importance determined. This method assumes the user's content to be stored in different devices on a LAN and requires the installation on a PC of the storage control application responsible for managing and performing the information content backups. Another requirement is the usage of UPnP (or any other software architecture in the network) in order to determine the different storage components on the network through the networks' registry and perform the backup procedures, but not all of the data source devices provide UPnP support (in these cases, it would be impossible to perform data backup).

SUMMARY OF THE INVENTION

The present invention aims to provide a backup method that enables creating a backup in an automatic way without the need of providing UPnP support. The invention thus provides a process for performing automatic backups of a user's data contained in the local drives of at least one computer of a local area network connected to a Residential Gateway, which is in turn connected to a provider's Backup Server. The method comprises the steps of:

a. sending a message to the local network in order to command the computer to start;
b. obtaining from a Backup Server by means of the Residential Gateway an image of an operating system specially adapted to perform a boot of the computer;
d. booting the computer;
e. asking the Residential Gateway for the user's preferences;
f. performing a backup in the computer following the preferences in e;
g. providing the data files obtained in f to the Residential Gateway;
h. uploading the files to the Backup Server.

Advantageously, the image operating system is cached at the Residential Gateway and the user sets his backup preferences by means of a GUI before step a. The backups can be incremental and all data should be encrypted in step f before sending it to the Residential Gateway.

BRIEF DESCRIPTION OF THE DRAWING

To complete the description and in order to provide for a better understanding of the invention, a drawing is provided. Said drawing forms an integral part of the description and illustrates a preferred embodiment of architecture for implementing the method of the invention, which should not be interpreted as restricting the scope of the invention, but just as an example of how the invention can be embodied.

DESCRIPTION OF THE INVENTION

A Residential Gateway (RG) is a connectivity device that replaces the traditional home modem router, so the RG connects all devices available in the house and provides them access to Internet through the operator's network. In addition to this, a RG usually includes one or more USB ports, in order to connect other devices such as an external USB hard disk or an USB printer.

The system to perform the method of the invention consists of the following elements (FIG. 1):

Computer (1): usually a laptop, a personal computer, or an ultra mobile PC where the user stores data like photos, documents, configuration files and similar data files. All data is saved in local drives.

Residential Gateway (2): The home networking device used to connect other devices in the home network, allowing the operator to deploy services on its embedded operating system.

Wake on LAN Module (a): The WOLM is a simple program executed by the PC Bios that allows a computer to be turned on by a network message sent by the Residential Gateway.

PXE Client (b): The pre-booting execution environment client (PXE client) allows the computer to be booted independently of the operating system previously installed on the computer and independently of the local storage devices (typically a hard drive or a DVD drive).

DHCP Client (f): The Dynamic Host configuration Protocol client allows the computer to obtain the necessary configuration of the IP protocol and an IP address sent by the Residential Gateway.

PXE Server Proxy (d): Acts as a proxy in order to allow computers to be remotely booted. This component sends an image of the operating system to the computer to be booted. This operating system is stored on the Backup Server. Thanks to this module, the backup process can be performed automatically, without requiring the user's attention and thanks to the combination with the Wake On LAN module, the backup can be even performed when the computer is switched off.

Backup and Settings (e): Provides a graphic user interface (GUI) where the user is able to configure his or her backup preferences such as, backup frequency and scheduling or backup data file types. The user preferences will be saved in the Residential Gateway. This module also performs encryption of data to be sent to the Storage server, providing the necessary privacy to the data sent through Internet to the Storage server (g). It optionally allows the user to perform incremental backups so the user will be able to get any data version and look up and retrieve data contents from a particular previous date.

DHCP Server (f): This component allows the computer to be configured with an IP address. The DHCP server also configures the computer domain names server, the default gateway, etc. This is a module usually included in commercial gateways Backup Server (3): It represents the OS images repository and the user's encrypted data backup storage.

Storage (g): This module allows the storage of the user encrypted data file which contents all information collected on the computers. All contents should be encrypted by default.

OS IMAGE(h): This module sends the operating system images to the PXE server proxy in order to boot remotely the computer. The image that is sent contains a special operating system built specifically for the invention. The operating system includes software that is in charge of performing the backup depending on the settings stored into the residential gateway. Thanks to this module, the user will not have to install any software on his/her computer. It provides robustness against wrong configurations, because the OS Image is obtained each time the backup is executed and the backup settings are stored in the Residential Gateway. Likewise, if the Residential Gateway has enough memory, a copy of the operating system will be cached in order to avoid additional downloads from the Backup Server.

DESCRIPTION OF A PREFERRED EMBODIMENT OF THE INVENTION

Following the system workflow is explained, this workflow will be executed for each Computer connected to the RG on which the backup is to be carried out.

The Backup & Settings Module, which is hosted in the Residential Gateway, asks to boot the computer. A broadcast message (typically a "Wake on LAN", or in the case of a wireless network a "Wake on Wireless") is sent to the local network in order to notice the computer to start. The message is typically a packet containing anywhere within its payload six bytes of ones followed by sixteen repetitions of the target computer's MAC address. The time to turn on the computer is scheduled in the Configuration Backup Service hosted in the Residential Gateway and the message is addressed to the Media Access Control address (MAC) of the target computer. The DHCP client (hosted in the computer) asks for an IP and the Server (RG) provides the IP address for getting an operating system image hosted in the Backup Server in order to be able to boot properly.

The RG asks Backup Server for an operating system image using HTTPS protocol. This image will be resent to the computer in order to allow the computer boot.

The Backup Server sends a preconfigured image of the Operating System to the RG using HTTPS protocol. This operating system image is an operating system with the only functionality of backing up the computer. It is a size reduced operating system specialized in disk access.

RG serves the operating system image to the computer using the PXE Proxy Server. The RG is provided with a Backup and Settings Module for pre-storing the user's preferences. The computer boots with the preconfigured operating system image, downloads the backup settings from the RG and makes a backup of all configured files. Then the computer stores all data in one or several encrypted data files. This file is encrypted with a public key algorithm such as DES, IDEA, RSA or MD5. The operating system makes the backup of all configured file types in the backup service hosted in the RG, typically:

All configuration files
All user data files (documents, pictures, etc.).

The computer sends the encrypted data file to the RG, which stores the encrypted data file in the Backup Server available on the Internet using a safe communication protocol, such as HTTPS and sends a special message to the RG in order to inform the Computer that the backup is finished. As a final step, the RG asks the computer to shutdown.

As it has been described, the user only has to set up the first time the backup through the residential gateway, using its interface, and then the gateway will do the backup automatically. The invention presents the following additional advantages: As a lightweight operating system will be loaded in order to do the backup, the user will not have to install any extra software.

As the settings of the backup are stored into the Residential Gateway and a specific operating system is loaded for the backup, it is more difficult that the system gets a wrong configuration than if the backup software was installed in the user operating system.

The system will store each change produced in any folder and any file that was selected by the user for backup, so the user will able to get any content version and will be able to look up the folder contents in a particular previous date. If needed, the system will be able to recover any previous version of data (incremental backups).

In this text, the term "comprises" and its derivations (such as "comprising", etc.) should not be understood in an excluding sense, that is, these terms should not be interpreted as excluding the possibility that what is described and defined may include further elements, steps, etc. On the other hand, the invention is obviously not limited to the specific embodiment(s) described herein, but also encompasses any variations that may be considered by any person skilled in the art within the general scope of the invention as defined in the claims.

The invention claimed is:

1. A process for performing automatic backups of a user's data contained in the local drives of at least one computer of a local area network connected to a Residential Gateway providing access to Internet through an operator's network, which is in turn connected to a provider's Backup Server, the process comprising the steps of:
   a. sending a broadcast message comprising a computer's MAC address, from the Residential Gateway to the local network in order to command the computer to start;
   b. asking to the Residential Gateway, by the computer as result of receiving the broadcast message, for an IP address for configuration;
   c. providing, by the Residential Gateway as result of step b, the IP address to get a preconfigured operating system image hosted at the Backup Server, wherein the preconfigured operating system image is an operating system having an only functionality of performing backups;
   d. booting the computer automatically with the preconfigured operating system image;
   e. asking the Residential Gateway for pre-stored user's backup preferences;
   f. performing a backup in the computer according to the pre-stored user's backup preferences, wherein the pre-stored user's backup preferences comprise at least one of: backup frequency, scheduling of backups or backup data file types;
   g. providing the data files obtained in step f to the Residential Gateway; and
   h. uploading the files to the Backup Server.

2. A process according to claim 1, wherein the image operating system is cached at the Residential Gateway.

3. A process according to claim 1, further comprising a step where the user sets his backup preferences by means of a GUI before a.

4. A process according to claim 1, wherein the backups are incremental.

5. A process according to claim 1, wherein the computer encrypts the data in e before sending it to the Residential Gateway.

* * * * *